United States Patent
Lance et al.

(10) Patent No.: US 11,049,071 B2
(45) Date of Patent: *Jun. 29, 2021

(54) CREATING AN AGGREGATE REPORT OF A PRESENCE OF A USER ON A NETWORK

(71) Applicant: INTERNATIONAL BUSINESS MACHINES CORPORATION, Armonk, NY (US)

(72) Inventors: John M. Lance, Littleton, MA (US); Eleni A. Rundle, Rochester, NY (US); Anuphinh P. Wanderski, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 15/831,208

(22) Filed: Dec. 4, 2017

(65) Prior Publication Data

US 2018/0096303 A1 Apr. 5, 2018

Related U.S. Application Data

(63) Continuation of application No. 12/625,044, filed on Nov. 24, 2009, now Pat. No. 9,886,681.

(51) Int. Cl.
*G06F 16/335* (2019.01)
*G06Q 10/10* (2012.01)
(Continued)

(52) U.S. Cl.
CPC ........... *G06Q 10/10* (2013.01); *G06F 16/335* (2019.01); *G06F 16/951* (2019.01); *G06F 16/9535* (2019.01)

(58) Field of Classification Search
CPC ............... G06F 16/3331; G06F 16/951; G06F 16/9535; G06F 16/335
See application file for complete search history.

(56) References Cited

U.S. PATENT DOCUMENTS

| 648,692 A | 5/1900 | Keyworth |
| 6,185,614 B1 | 2/2001 | Cuomo |
| (Continued) | | |

FOREIGN PATENT DOCUMENTS

| JP | 2002-007534 A | 1/2002 |
| JP | 2008-234090 A | 10/2008 |
| (Continued) | | |

OTHER PUBLICATIONS

Akemi Miyamoto, Catch up with and get ahead of Google Labs, Forecasting web future, 2009, Syuukan (Weekly) ASCII, vol. 21, Serial vol. 733, Japan, ASCII Media Works Inc., Apr. 28, 2009, pp. 114-119.

(Continued)

*Primary Examiner* — Apu M Mofiz
*Assistant Examiner* — Sheryl L Holland
(74) *Attorney, Agent, or Firm* — Fabian VanCott; Steven L. Nichols

(57) ABSTRACT

A method performed by a physical computing device communicatively coupled to a computer network for creating an aggregate report of a presence of a user of the physical computing device on the network includes periodically searching the network with the physical computing device for content related to the user authored by a source other than the user, the searching being based on a unique set of identifiers associated with the user, dynamically updating the unique set of identifiers based on contextual trends within content returned as a result of the searching, and aggregating content published by the user to the network (Continued)

with the content returned as a result of the searching to form the aggregate report of the presence of the user on the network.

20 Claims, 6 Drawing Sheets

(51) Int. Cl.
  *G06F 16/951* (2019.01)
  *G06F 16/9535* (2019.01)

(56) References Cited

U.S. PATENT DOCUMENTS

| | | | |
|---|---|---|---|
| 6,532,459 | B1 | 3/2003 | Berson |
| 6,839,680 | B1 | 1/2005 | Liu |
| 6,904,408 | B1 | 6/2005 | McCarthy |
| 7,240,067 | B2 | 7/2007 | Timmons |
| 7,243,105 | B2 | 7/2007 | Thint |
| 7,346,923 | B2 | 3/2008 | Atkins |
| 7,418,518 | B2 | 8/2008 | Grove |
| 8,086,622 | B2* | 12/2011 | Bennett .............. G06F 16/951 707/766 |
| 8,214,380 | B1 | 7/2012 | Bettinger |
| 8,296,245 | B2 | 10/2012 | Barber |
| 8,386,564 | B2 | 2/2013 | Pennington |
| 8,943,211 | B2 | 1/2015 | Rehfuss |
| 9,680,861 | B2 | 6/2017 | Ward |
| 9,686,291 | B2 | 6/2017 | Antonakakis |
| 2002/0023122 | A1 | 2/2002 | Polizzi |
| 2004/0111467 | A1 | 6/2004 | Willis |
| 2004/0128156 | A1 | 6/2004 | Beringer |
| 2004/0167864 | A1 | 8/2004 | Wang |
| 2005/0080769 | A1 | 4/2005 | Gemmell |
| 2005/0234891 | A1 | 10/2005 | Walther |
| 2005/0278540 | A1 | 12/2005 | Cho |
| 2006/0004691 | A1 | 1/2006 | Sifry |
| 2006/0080598 | A1 | 4/2006 | Bargeron |
| 2006/0089887 | A1 | 4/2006 | Shioda |
| 2006/0136589 | A1 | 6/2006 | Konig |
| 2007/0239535 | A1 | 10/2007 | Koran |
| 2008/0077517 | A1 | 3/2008 | Sappington |
| 2008/0109244 | A1* | 5/2008 | Gupta .................... G06Q 30/02 705/1.1 |
| 2008/0120411 | A1 | 5/2008 | Eberle |
| 2008/0133747 | A1* | 6/2008 | Fish ...................... H04L 63/102 709/224 |
| 2008/0154856 | A1 | 6/2008 | Riise |
| 2008/0178302 | A1* | 7/2008 | Brock .................. G06F 16/951 726/32 |
| 2008/0189286 | A1 | 8/2008 | Choi |
| 2008/0189360 | A1 | 8/2008 | Kiley |
| 2008/0222142 | A1 | 9/2008 | O'Donnell |
| 2008/0306956 | A1 | 12/2008 | Werthessen |
| 2009/0006974 | A1 | 1/2009 | Harinarayan |
| 2009/0013041 | A1 | 1/2009 | Farmer |
| 2009/0055374 | A1* | 2/2009 | Surazski ............. G06F 16/9535 |
| 2009/0077495 | A1 | 3/2009 | Brat |
| 2009/0089264 | A1 | 4/2009 | Lavine |
| 2009/0093367 | A1 | 4/2009 | Kubik |
| 2009/0132689 | A1 | 5/2009 | Zaltzman |
| 2009/0228379 | A1 | 9/2009 | Honts |
| 2009/0234878 | A1* | 9/2009 | Herz .................. H04N 21/4532 |
| 2009/0287657 | A1 | 11/2009 | Bennett |
| 2009/0287713 | A1 | 11/2009 | Anderson |
| 2010/0070448 | A1 | 3/2010 | Omoigui |
| 2010/0262592 | A1 | 10/2010 | Brawer |
| 2010/0306185 | A1 | 12/2010 | Smith |
| 2011/0055012 | A1 | 3/2011 | Christianson |

FOREIGN PATENT DOCUMENTS

| | | |
|---|---|---|
| JP | 2009-193201 A | 8/2009 |
| JP | 2009-193202 A | 8/2009 |

OTHER PUBLICATIONS

Aguillo et al., "Scientific Research Activity and Communication Measured With Cybermetrics Indicators", 2006, Journal of the American Society for Information Science and Technology, 57(10): 1296-1302.

Madden et al., "Digital Footprints: Online Identity Management and Search in the Age of Transparency", Dec. 16, 2007, Pew Research Center Publications, www.pewresearch.org/pubs/663/digital-footprints.

M. Sponder, "Learn to Measure Your Web Presence", Apr. 20, 2009, www.entrepreneur.com/article/201332.

Ghosh et al., Discovering User Profiles, WWW 2009 Madrid, poster sessions: Friday, Apr. 24, 2009, Hewlett-Packard Laboratories, Palo Alto, California.

Kindberg et al., People, Places, Things: Web presence for the Real World, Hewlett Packard Laboratories, Mobile Networks and Applications 7, 365-376, 2002. Palo Alto California.

Nentwich et al., xlinkit: A Consistency Checking and Smart Link Generation Service, University College London, ACM Transactions on Internet Technology, vol. 2, No. 2, May 2002, pp. 151-185.

Kiyomitsu et al., ActiveWEB: XML-Based Active Rules for Web View Derivations and Access Control, KnowledgeGate from IBM Market Insights. Sep. 11, 2009, IEEEXplore.

Mauroux et al., PicShark: mitigating metadata security scarcity through large-scale P2P collaboration, Digital Enterprise Research Institute, National University of Ireland, Galway, Ireland, VLDB Journal (2008) 17:1371-1384.

\* cited by examiner

600

Periodically search the network with a physical computing device for content related to the user authored by a source other than the user, the search being based on a unique set of identifiers associated with the user
(step 602)

Dynamically update the unique set of identifiers based on contextual trends within content resulting from the search
(step 604)

Aggregate content published by the user to the network with the content resulting from the search to form an aggregate report of the present of the user on the network
(step 606)

Present the aggregate report of the presence of the user on the network to at least the user through a user interface of the computing device
(step 608)

*Fig. 6*

CREATING AN AGGREGATE REPORT OF A PRESENCE OF A USER ON A NETWORK

BACKGROUND

Aspects of the present invention relate in general to the reporting of an individual's presence over a network, and more particularly, to methods and systems for creating and managing a report of an individual's presence over a network.

An individual or organization is said to have a presence on a network when content accessible through the network is publicly attributed to or associated with that individual or organization. For example, an individual may use a network such as the Internet to publish content authored by the individual, such as blog postings, discussion forum postings, social network content, public photos, wiki entries, personal websites, and the like. Any such information that includes the name of the individual authoring the content or publicly references the individual in some other way is part of the presence of that individual on the Internet. In many cases, the network presence of an individual or organization may include third-party content that was not authored by the individual or organization, but still references or otherwise identifies the individual or organization. Examples of such third-party content include, but are not limited to, news publications, public records, profiles on professional or employer-related websites, personal websites or blogs, social network content, public photos, directories, and the like.

It is often the case that content associated with an individual or an organization can affect how others perceive the individual or organization. Accordingly, an individual or organization may wish to ascertain its overall network presence.

BRIEF SUMMARY

A method performed by a physical computing device communicatively coupled to a computer network for creating an aggregate report of a presence of a user of the physical computing device on the network includes periodically searching the network with the physical computing device for content related to the user authored by a source other than the user the searching being based on a unique set of identifiers associated with the user, dynamically updating the unique set of identifiers based on contextual trends within content returned as a result of the searching, and aggregating content published by the user to the network with the content returned as a result of the searching to form the aggregate report of the presence of the user on the network.

A physical network presence management system includes a processor and a memory communicatively coupled to the processor, the memory including executable code stored thereon such that the executable code, when executed by the processor, causes the processor to implement a network browser. The processor is configured to track content uploaded to a network through the network browser, periodically search the network for content related to the user authored by a source other than the user; the searching being based on a unique set of identifiers associated with the user, dynamically update the set of unique identifiers based on contextual trends within content returned as a result of the searching, and aggregate content published by the user with the content returned as a result of the searching to form an aggregate report of the presence of the user on the network.

A computer program product for forming an aggregate report of a presence of a user on a network, the computer program product includes a computer readable storage medium having a network browser embodied as computer readable code. The computer readable program code includes computer readable program code configured to track content uploaded to the network through the network browser, computer readable program code configured to periodically search the network for content related to the user authored by a source other than the user; the searching being based on a unique set of identifiers associated with the user, computer readable program code configured to dynamically update the set of unique identifiers based on contextual trends within content returned as a result of the searching, and computer readable program code configured to aggregate content published by the user with the content resulting returned as a result of the searching to form an aggregate report of the presence of the user on the network.

BRIEF DESCRIPTION OF SEVERAL VIEWS OF THE DRAWINGS

The accompanying drawings illustrate various embodiments of the principles described herein and are a part of the specification. The illustrated embodiments are merely examples and do not limit the scope of the claims.

FIG. 6 is a flowchart showing an illustrative method for forming a network presence, according to one embodiment of principles described herein.

Throughout the drawings, identical reference numbers designate similar, but not necessarily identical, elements.

DETAILED DESCRIPTION

Figure 1:
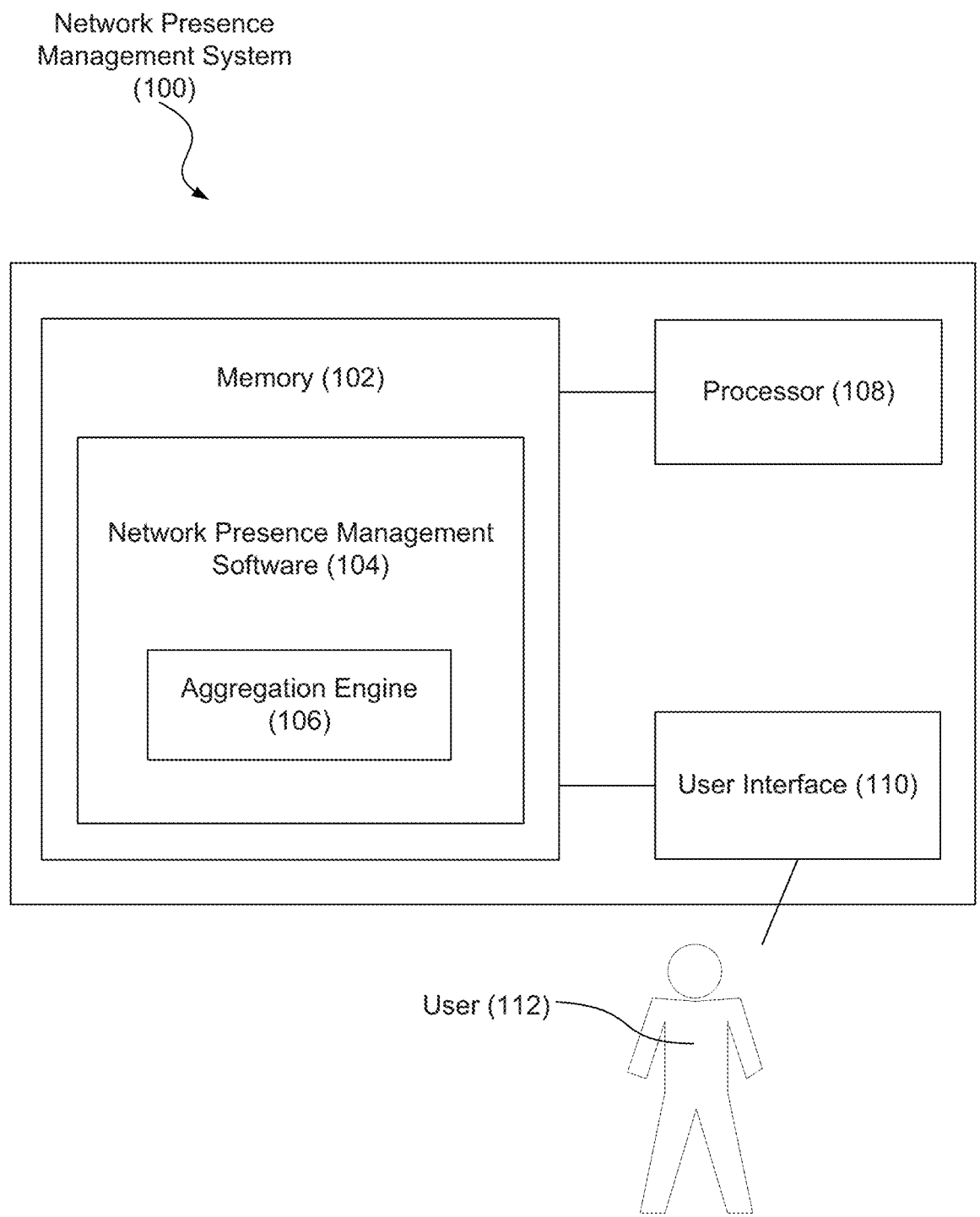
FIG. 1 is a diagram showing an illustrative network presence management system, according to one embodiment of principles described herein.

The present specification discloses methods and systems to determine a network presence for a particular user. In addition the present specification discloses methods and systems that allow the user to manage his or her network presence. According to certain illustrative embodiments, a network management system may be configured to periodically search a network for content related to a particular individual. This content may or may not have been authored or published by the individual. The search may be based on a set of unique identifiers associated with the individual. The network presence management system may be configured to update the set of unique identifiers based on additional identifiers found within the content resulting from the periodic searching. An aggregate report of content found on the network related to the individual may then be formed.

A method or system embodying principles described herein may allow a group or individual to see a report of its presence on a network. In some embodiments, an individual may view and edit the content that is associated with his or her aggregate report. In some embodiments, an aggregate report may be made available to other individuals.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the phrase "aggregate report of a network presence" is to be broadly interpreted as a compiled description of content on a network which is in some manner related to or associated with a particular individual or organization. The term "individual" will be understood to refer in the claims to either a particular individual or an organization. The term "network presence management system" is to be broadly interpreted as a physical computing system having software stored thereon, the software being configured to instruct a processor of the physical computing system to perform operations related to the forming and management of an individual's network presence.

Throughout this specification and in the appended claims, the term "content" is to be broadly interpreted as an object published on a network including, but not limited to, a wiki entry, a blog posting, a discussion forum posting, an article, an electronic document, an electronic file, and a website.

Throughout this specification and in the appended claims, the term "unique identifier" is to be broadly interpreted as a term, title, or object associated with a piece of content on a network which may be related to a particular individual or group. Unique identifiers may be used to relate certain content with a particular individual or group.

Referring now to the figures, FIG. 1 is a diagram showing an illustrative network presence management system (100).

According to certain embodiments, a network presence management system (100) may include a memory (102) having a network presence management software (104) including an aggregation engine (106) stored thereon. The network presence management system (100) may also include a processor (108) and a user interface (110).

As will be appreciated by one skilled in the relevant art, a physical computing device employs a form of memory (102). The memory (102) may include memory storage devices such as hard disk drives, solid state drives, and optical disc drives. Additionally, the memory (102) may include faster forms of memory typically used for temporary storage such as various forms of Random Access Memory (RAM). A processor (108) may be configured to execute instructions which are retrieved from memory (102).

The network presence management software (104) may be configured to search a network for content related to a particular individual. The software (104) may also be configured to display to a user a collection of content related to the user. As mentioned above, content related to an individual may include, but is not limited to, blog postings, discussion forum postings, wiki entries, news articles, public records, personal websites, directory information, professional websites, and other forms of network publication.

An aggregation engine (106) may be used to aggregate various content found by the network presence management system (100). An aggregation engine (106) may be a software module configured to collect and sort content related to various individuals. The aggregation engine (106) may be configured to compile a report of the content found on a network related to a particular individual. Throughout the rest of this specification, the report will be referred to as an "aggregate report."

A user interface (110) may provide a means for the user (112) interact with a computerized calendar system (100). A user interface may include an output component such as a display device and input components such as a mouse or keyboard. Information associated with an aggregate report may be displayed to the user (112) through a display device. Instructions from the user to the computerized calendar system (100) may be received through a keyboard or mouse.

Figure 2:
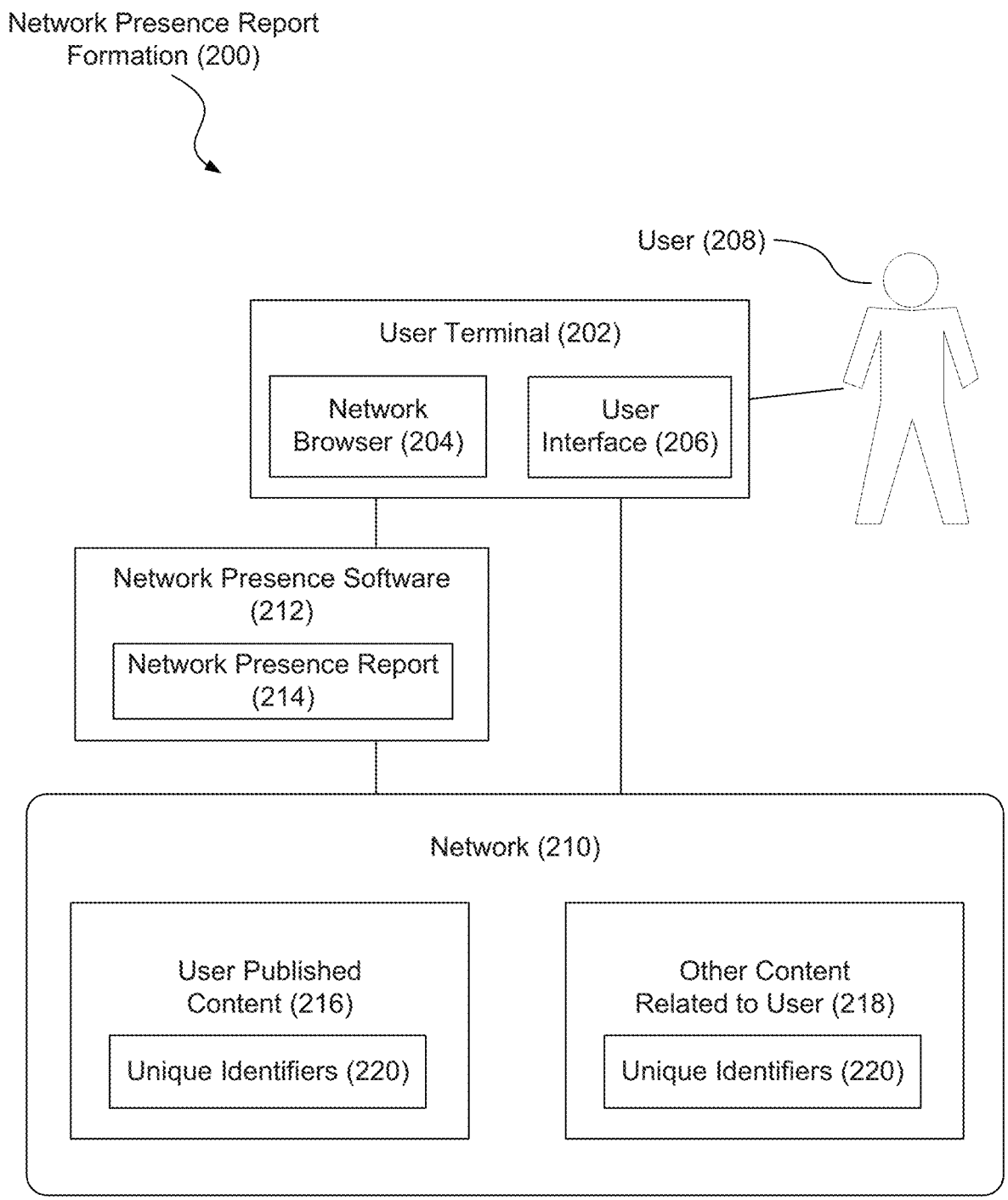
FIG. 2 is a diagram showing an illustrative process for network presence report formation, according to one embodiment of principles described herein.

FIG. 2 is a diagram showing an illustrative process (200) for creating an aggregate network presence report (214) of a user (208). The user (208) may represent an individual or an organization or other group. According to certain embodiments, the process (200) for creating the network presence report (214) may involve a user terminal (202) including a network browser (204) and a user interface (206), network presence software (212), a network (210) having user published content (216) and other content (218) related to the user (208) stored thereon. All user related content may have unique identifiers (220) associated therewith.

A user may gain access to a network presence management system through the user terminal (202). The user terminal (202) may be embodied as a workstation and/or computing system including, but not limited to, a laptop computer, a desktop computer, a server, and a Personal Digital Assistant (PDA) or other portable computing device. The user interface (206) associated with the user terminal (202) may provide the user (208) a way to access a network (210) through a network browser (204).

The network browser (204) is a software entity which provides the user (208) access to content over the network (210). In certain embodiments, the network (210) may be the Internet. Additionally or alternatively, the network (210) may be a corporate intranet or another local area network (LAN) or wide area network (WAN). The network browser (204) may allow the user (208) to publish content on the network (210). In certain embodiments, the network browser (204) may track actions performed by the user (208) and add any content (216) published by the user (208) to his or her network presence report (214).

In addition to the network presence report (214) having content published by the user (208), the network presence software (212) may be configured to search the network (210) for new content related to the user (208). This may be done by searching for unique identifiers (220) that may identify the particular user (208). A unique identifier may be a term or website that is associated with the particular user (208).

The network presence software (212) may be stored locally on the user terminal (202). Additionally or alternatively, the network presence software (212) may reside on a server somewhere on the network (210) and be made available to a user terminal (202) as a web application.

Figure 3A:
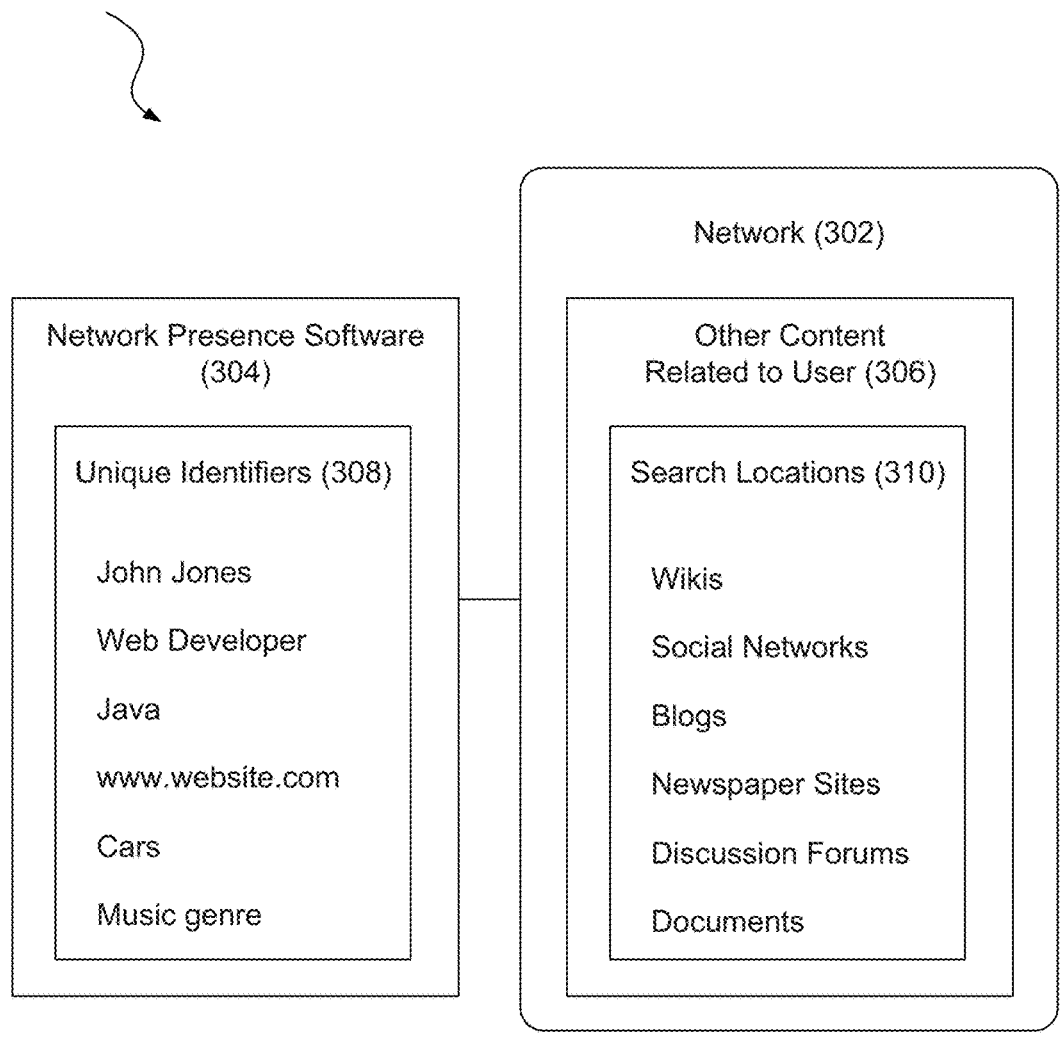
FIG. 3A is a diagram showing an illustrative process for updating content, according to one embodiment of principles described herein.

FIG. 3A is a diagram showing an illustrative process for updating content (300). According to certain illustrative embodiments, a user's network presence (304) may be associated with several unique identifiers (308) which may be used to search for content (306) related to a user at several locations (310) on a network (302).

In certain embodiments, a user may define his or her own unique identifiers. For example, a user may use his or her name, profession, hobbies, and websites he or she commonly uses as unique identifiers (308). The network presence software (304) may then be configured to search the network (302) for content which includes any of the unique identifiers (308).

The network presence software (304) may be configured to periodically crawl the network for content related to a particular user. In some embodiments, the network presence software may be configured to search network locations (310) where new content (306) related to a particular user is likely to be found. This may be done by searching for one or more of the unique identifiers (304) associated with the user. As used in the present specification and in the appended claims, the term "crawl" is to be construed broadly as meaning to automatically browse network content in a systematic, methodical manner. These locations (310) may include, but are not limited to, wiki entries, social networks, blogs, newspaper sites, discussion forums, and documents. In certain embodiments, a standard set of search locations (310) on the network (302) may be crawled. This standard set of search locations (310) may include every location on the network (302) available to the network presence software (304). Additionally or alternatively, the user or another entity may specify some or all of the locations (310) to be crawled in search of content (306) related to the user. In certain embodiments, a large set of search locations (310) may be divided into multiple subsets such that one or more of the subsets is crawled more frequently than others of the subsets.

Figure 3B:
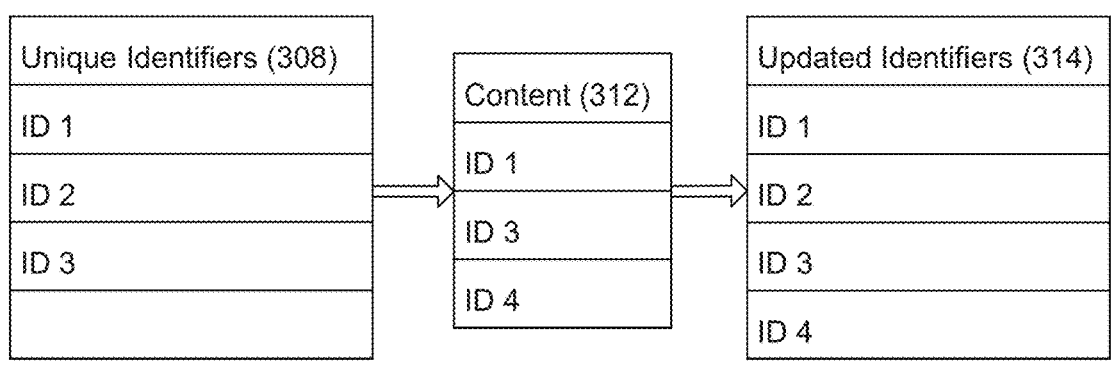
FIG. 3B is a diagram showing an illustrative process for updating unique identifiers, according to one embodiment of principles described herein.

FIG. 3B is a diagram showing an illustrative process for updating unique identifiers (316). According to certain illustrative embodiments, a set of unique identifiers (308) may search the context of newly acquired content (312) related to a user for common objects. These common objects may then be used to create an updated set of identifiers (314) including the new unique identifiers.

By dynamically updating the set of unique identifiers (308), the network presence software (304) may be able to maintain a more accurate set of identifiers for a particular user. According to certain embodiments, when new content (312) is found, the network presence software may be configured to search the new content (312) for common terms or objects. If a certain term or object meets a predetermined set of conditions such as how often the term or object appears, then that term or object may be added to the list of unique identifiers. The updated list of unique identifiers (314) may then be used to search the network (302) for additional content (306) related to a particular user.

Figure 4:
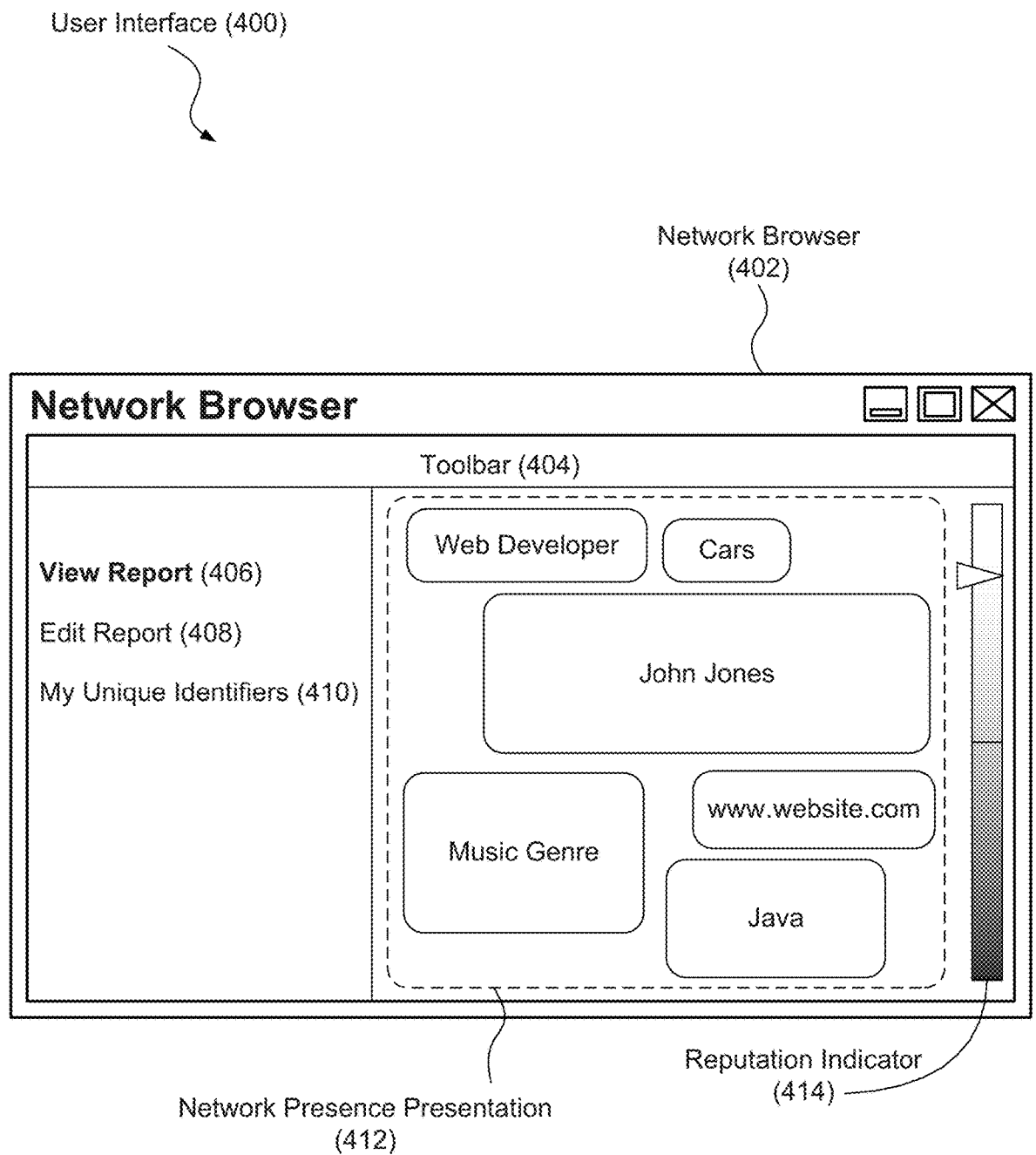
FIG. 4 is a diagram showing an illustrative user interface for managing a network presence, according to one embodiment of principles described herein.

FIG. 4 is a diagram showing an illustrative user interface (400) for managing network presence. According to certain illustrative embodiments, a user may view and manage their network presence from a network browser (402). The options available through the browser may include "view report" (406), "edit report" (408), and "my unique identifiers" (410). The network browser may also show a network presence presentation (412) as well as a reputation indicator (414).

According to certain embodiments, a user may manage or view a report of his or her network presence through the network browser (402). In certain embodiments, an add-on application may be provided to extend the functionality of the network browser. The user may also be provided with a toolbar (404) which may provide him or her with various functions and options associated with the network presence management software as well as network browsing.

As shown in FIG. 4, the user may be able to view his or her network presence report directly in the network browser (402). This report may be shown textually or graphically. FIG. 4 shows a graphical presentation (412) of a network presence. In the present example of a graphical presentation (412), each unique identifier may be displayed along with a shape. The size of the shape may be a function of how prevalently its associated unique identifier is found over the network in question.

In certain embodiments, a user may have the ability to edit his or her network presence report. For example, a user may notice that a particular piece of content has been falsely attributed to him or her by the network presence management software. A user may also be provided with a "my unique identifiers" (410) option that allows the user to view and, in certain embodiments, modify the unique identifiers that have been attributed to his or her network presence report.

In certain embodiments, a reputation indicator (414) may be displayed through the network browser (402). The reputation indicator (414) may indicate how a user's network presence is likely to be viewed or is viewed by others. For example, if several articles have been written which praise a particular user, then that reputation may present a more negative indication. Conversely, if there is content that portrays a user negatively, then the reputation indicator may show a more negative indication.

Figure 5:
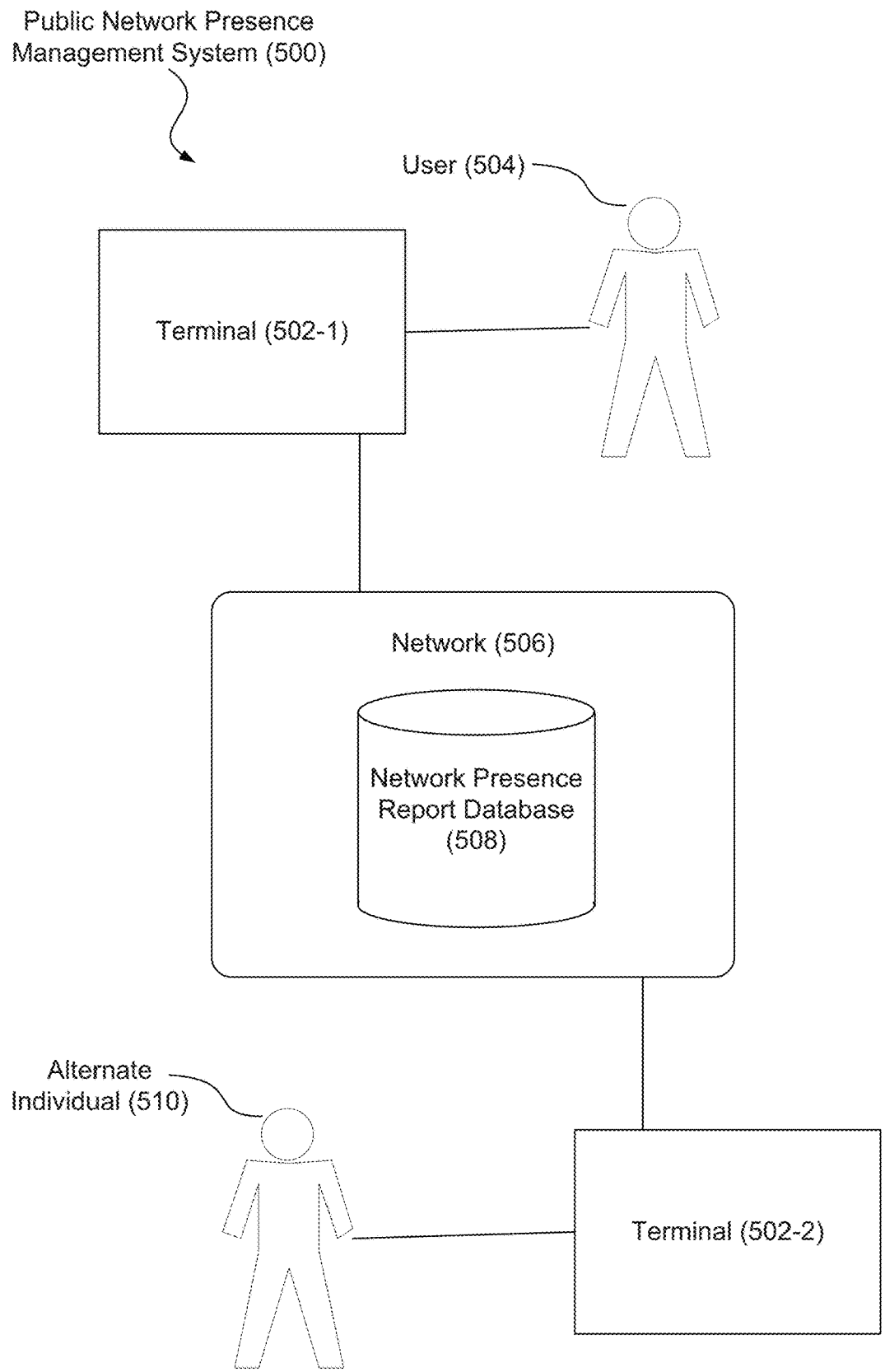
FIG. 5 is a diagram showing an illustrative public network presence management system which may provide public network presence reports, according to one embodiment of principles described herein.

FIG. 5 is a diagram showing an illustrative public network presence management system (500) which may be used to provide public network presence reports. According to certain embodiments, a network presence management system (500) may include a database (508) of several users' web identities. In addition to a user (504) accessing the network presence management system (500) through a terminal (502-1), an alternate user (510) may be able to access the user's (504) network presence from a terminal (502-2).

In some embodiments, network presence reports for several users may be available to the public. This may allow a landlord to view network presence reports for prospective tenants. It may also allow employers to view network presence reports for potential employees. In such an embodiment, it may be beneficial to prohibit a user from altering their network presence report as doing so may allow a user to unfairly present his or her reputation.

An embodiment that provides network presence reports to the public may be embodied in the form of a network presence report database (508) stored somewhere on a network (506). A user (504) may be able to access the database (508) to view their own network presence report through a terminal (502-1). Likewise, an alternate user (510) may access the database (508) through a separate terminal (502-2) to view a user's (504) network presence report.

FIG. 6 is a flowchart showing an illustrative method for forming a network presence. According to certain embodiments, the method may include periodically searching (step 602) the network with the physical computing device for content related to the user authored by a source other than the user, the searching being based on a unique set of identifiers associated with the user, dynamically updating (step 604) the unique set of identifiers based on contextual trends within content resulting from the searching, and aggregating (step 606) content published by the user to the network with the content resulting from the searching to form the aggregate, report of the presence of the user on the network. The method may further include presenting (step 608) the aggregate report of the presence of the user on the network to at least the user through a user interface of the computing device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is no intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A physical network presence management system comprising:
   a processor with a network interface;
   a memory communicatively coupled to the processor, the memory comprising executable code stored thereon such that the executable code, when executed by the processor, causes the processor to:
      maintain a unique set of identifiers associated with an individual, the unique set of identifiers comprising a plurality of identifiers, each identifier in the set specifying a different characteristic of the individual such that, collectively, the unique set of identifiers more accurately identifies references to the individual in network content, the set of identifiers including a name of the individual and at least one other detail specific to the individual;
      automatically and periodically search a network, through the network interface, for the unique set of identifiers to identify content published on the network that references the individual as determined based on the unique set of identifiers associated with the individual, content being identified as referencing the individual based on consideration of all the plurality of identifiers in the set collectively;
      search the identified content found on the network that is related to the individual for a term that meets a predetermined criterion; and
      in response to identifying a term that appears in the identified content and meets the predetermined criterion, add the term to the set of unique identifiers as an additional identifier found within the identified content, the term then being used with other identifiers in the set during subsequent rounds of the automated, periodic searching.

2. The system of claim 1, wherein the executable code causes the processor to prepare a report of identified content found on the network that is related to the individual as determined using the set of unique identifiers to provide the individual with an indication of a reputation of the individual within content of the network.

3. The system of claim 2, wherein the report including a reputation indicator displayed in a network browser, the reputation indicator indicating whether, based on identified network content, the individual is more likely to have a positive or negative reputation among other network users.

4. The system of claim 2, the processor further to notify the individual that the report provides at least one of: a positive portrayal of the individual, a negative portrayal of the individual, and a neutral portrayal of the individual.

5. The system of claim 4, the processor further to indicate to the individual a degree of positivity or negativity of the portrayal.

6. The system of claim 1, wherein the executable code causes the processor to output a reputation indicator, the reputation indicator indicating whether, based on identified network content, the individual is more likely to have a positive or negative reputation among other network users.

7. The system of claim 1, wherein the executable code causes the processor to implement a network crawler to automatically browse network content looking for the unique set of identifiers.

8. The system of claim 1, wherein the identified content includes both content published by the individual and content not published by the individual.

9. The system of claim 1, wherein the identified content is content not published by the individual.

10. The system of claim 1, wherein an additional identifier is added to the set of unique identifiers based on a frequency with which that additional identifier appears in the identified content.

11. The system of claim 1, wherein an additional identifier is added to the set of unique identifiers based a contextual trend in the identified content.

12. The system of claim 1, further comprising a user interface to accept user input modifying the set of unique identifiers.

13. The system of claim 1, the processor further to track actions performed by the individual on the network and add any content published by the individual to the network to the identified content for use in generating the aggregate report.

14. The system of claim 1, wherein the set of unique identifiers includes websites the individual repeatedly uses.

15. A physical network presence management system comprising:
    a processor with a network interface;
    a memory communicatively coupled to the processor, the memory comprising executable code stored thereon such that the executable code, when executed by the processor, causes the processor to:
       maintain a unique set of identifiers associated with the individual, the unique set of identifiers comprising a plurality of identifiers, each identifier in the set specifying a different characteristic of the individual such that, collectively, the unique set of identifiers more accurately identifies references to the individual in network content, the set of identifiers including a name of the individual and at least one other detail specific to the individual;
       automatically and periodically search the network using the unique set of identifiers as search criteria to identify content published on the network that is related to the individual;
       search the identified content found on the network that is related to the individual for a term that meets a predetermined criterion; and
       in response to identifying a term that appears in the identified content and meets the predetermined criterion, add the term to the set of identifiers as an additional identifier found within the identified content, the term then being used with other identifiers in the set during subsequent rounds of the automated, periodic searching.

16. The system of claim 15, further comprising executable code that, when executed by the processor, causes the processor to prepare a report of identified content found on the network that is related to the individual as determined using the set of identifiers to provide the individual with an indication of the reputation of the individual within content of the networks.

17. The system of claim 15, further comprising executable code that, when executed by the processor, causes the processor to automatically crawl network content looking for the unique set of identifiers.

18. The method of claim 15, wherein an additional identifier is added to the set of identifiers based on a frequency with which that additional identifier appears in the identified content.

19. The system of claim 15, further comprising executable code that, when executed by the processor, causes the processor to accept user input modifying the set of identifiers.

20. The system of claim 15, further comprising executable code that, when executed by the processor, causes the processor to track actions performed by the individual on the network and add any content published by the individual to the network to the identified content for use in generating the report.

* * * * *